United States Patent [19]
Ishida et al.

[11] Patent Number: 6,160,335
[45] Date of Patent: Dec. 12, 2000

[54] TERMINAL ARRANGEMENT OF VEHICLE AC GENERATOR

[75] Inventors: Hiroshi Ishida, Anjo; Akiya Shichijyo, Ama-gun, both of Japan

[73] Assignee: Denso Corporation, Kariya, Japan

[21] Appl. No.: 09/427,545

[22] Filed: Oct. 27, 1999

[30] Foreign Application Priority Data

Dec. 25, 1998 [JP] Japan .................................. 10-370323

[51] Int. Cl.$^7$ .................................................. H02K 11/00
[52] U.S. Cl. .......................... 310/68 D; 310/71; 310/64; 363/145; 439/874; 361/690
[58] Field of Search ................ 310/68 D, 68 R, 310/71, 64, 51; 363/141, 145, 126, 146; 439/485, 486, 874; 361/690, 694, 695; 174/68.1

[56] References Cited

U.S. PATENT DOCUMENTS

| | | | |
|---|---|---|---|
| 5,210,928 | 5/1993 | Seshita et al. .............................. | 29/596 |
| 5,350,959 | 9/1994 | Flaminio et al. .......................... | 310/71 |
| 5,640,062 | 6/1997 | Yockey .................................. | 310/68 D |
| 5,682,070 | 10/1997 | Adachi et al. ............................ | 310/71 |
| 5,892,308 | 4/1999 | Abadia et al. ......................... | 310/68 D |

FOREIGN PATENT DOCUMENTS

| | | |
|---|---|---|
| 5-49221 | 2/1993 | Japan . |
| 2235822 | 3/1991 | United Kingdom . |

*Primary Examiner*—Nestor Ramirez
*Assistant Examiner*—Thanh Lam
*Attorney, Agent, or Firm*—Pillsbury Madison & Sutro LLP

[57] ABSTRACT

A vehicle AC generator includes a rectifier unit having plus cooling fin carrying a plurality of plus diodes, a minus cooling fin carrying a plurality of minus diodes, and a connection member disposed between the plus and minus cooling fins for insulating the two fins and connecting the plus and minus diodes. A plurality of U-shaped terminal members axially extend from the connection member which respectively guide the leads of the armature winding. Each of the terminal members has three longitudinal side walls forming generally rectangular cross-section, one end connected to the rectifier unit, the other end connected to one of the leads, and a heat-block portion having at least two of the side walls.

8 Claims, 4 Drawing Sheets

TERMINAL ARRANGEMENT OF VEHICLE AC GENERATOR

CROSS REFERENCE TO RELATED APPLICATION

The present application is based on and claims priority from Japanese Patent Application Hei 10-370323 filed on Dec. 25, 1998, the contents of which are incorporated herein by reference.

BACKGROUND OF THE INVENTION

1. Field of the Invention

The present invention relates to a terminal arrangement of an AC generator for a vehicle.

2. Description of the Related Art

In a vehicle AC generator, terminal members connecting the leads of an armature winding and a rectifier unit are exposed to strong vibration. Because the armature winding and the rectifier unit are located separately, they are vibrated at different vibration frequencies and vibration phases, resulting in that terminal members may be deformed or broken due to strong stress applied thereon.

If the leads and the rectifier unit are connected by welding, it is necessary to prevent the welding heat from transferring to the rectifier unit which includes positive and negative diodes and a connection member for connecting the positive and negative diodes.

GB 2235822 discloses a plurality of metal terminal members for connecting leads of an alternator armature winding and diodes of a rectifier unit. The metal terminal member is a slender metal plate which has a U-shaped crimped edge for tightly grasping the connecting leads. That is, the terminal member has a notch in the sense of the notch effect between the plate portion and the U-shaped edge, and the edge may be broken due to strong vibration.

SUMMARY OF THE INVENTION

A main object of the invention is to provide an improved terminal member that is resistant to strong vibration and effective to prevent heat transmission to the rectifier unit.

According to a preferred embodiment of the invention, a vehicle AC generator includes a plurality of U-shaped terminal members extending from a connection member of a rectifier unit disposed between positive and negative cooling fins. The U-shaped terminal member guides a lead extending from an armature winding. The terminal member has three longitudinal side walls forming generally rectangular cross-section, one end connected to the rectifier unit, the other end connected the lead, and a heat-block portion having at least two of the three side walls.

The heat block portion has sufficient strength against strong vibration applied thereto and effectively blocks heat when the terminal member and lead are welded together. The heat block portion can be partly disposed inside the connection member.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A terminal member according to a first embodiment of the invention is described with reference to FIGS. 1, 2 and 3.

Figure 1:
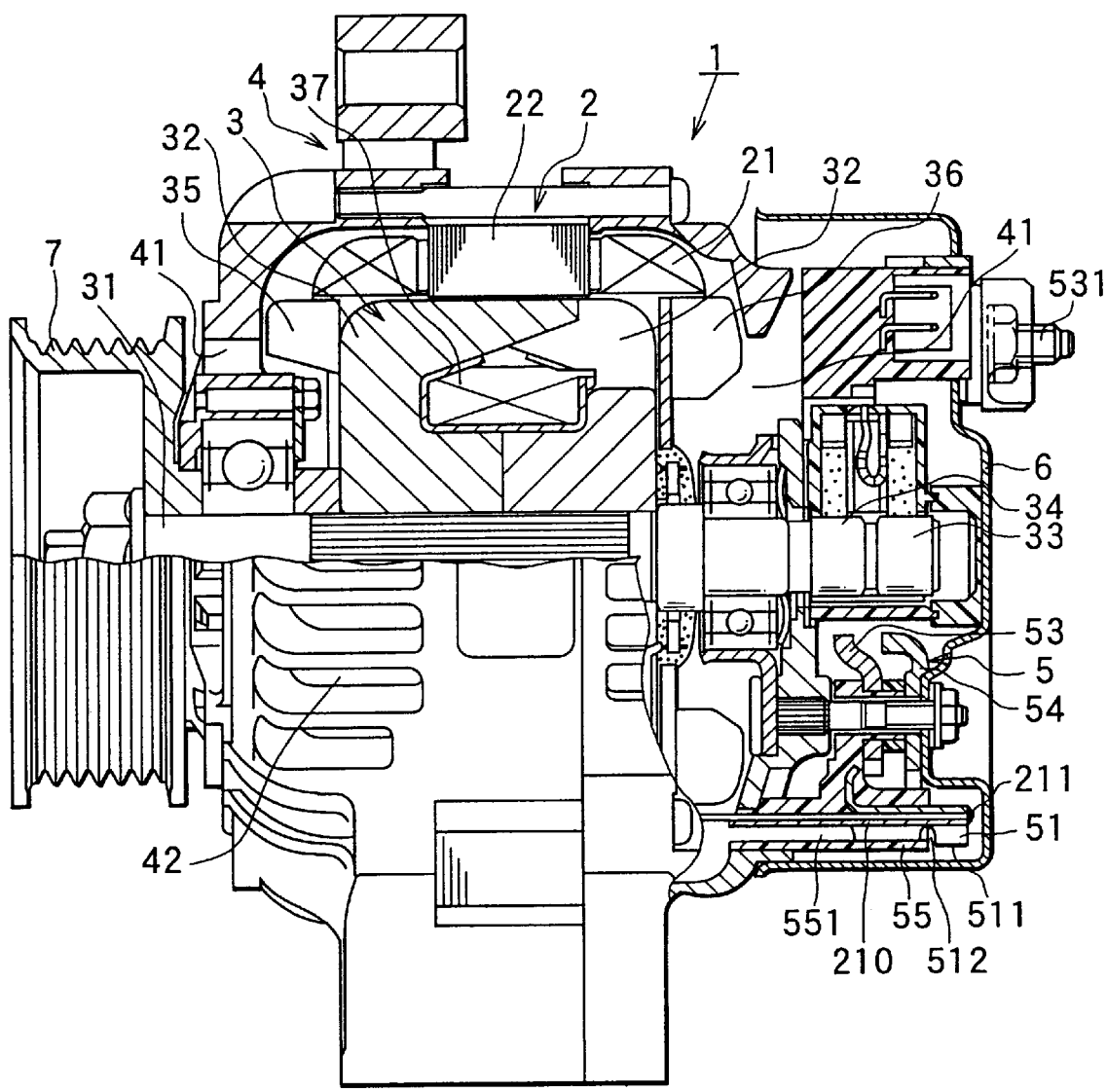
FIG. 1 is a longitudinal cross-sectional view of a vehicle AC generator according to a first embodiment of the invention.

In FIG. 1, a vehicle AC generator 1 includes stator 2, rotor 3, housing 4 supporting stator 2 and twelve-poled rotor 3, rectifier unit 5, and rear cover 6 for protecting rectifier unit 5 and others.

Stator 2 is composed of three phase armature winding 21 and stator core 22. Stator core 22 has thirty six slots (not shown) in the inner periphery at equal intervals to accommodate armature winding 21. Armature winding 21 is formed of flat copper wires and has three leads 210 axially extending to the outside of housing 4. Armature winding 21 also can be formed of round wires.

Rotor 3 includes shaft 31, pole core 32 having twelve claw poles, field coil 37, slip rings 33, 34, mixed-flow cooling fan 35 and centrifugal cooling fan 36. Shaft 31 has pulley 7 at one end thereof to be driven by an engine via a belt (not shown).

Housing 4 supports stator 2, rotor 3 and rectifier unit 5. Housing 4 has air intake windows 41 and air discharge windows for mixed-flow fan 35 and centrifugal fan 36 respectively at the opposite ends and at the outer periphery thereof.

Rectifier unit 5 includes a three-phase full-wave rectifier bridge circuit composed of three positive diodes (not shown) held on positive cooling fin 53 disposed near stator 2, three negative diodes (not shown) held on negative cooling fin 54 disposed spaced apart from and in parallel with positive cooling fin 53, and connection member 55 disposed between positive and negative cooling fins 53, 55.

Connection member 55 includes a circuit connecting the positive and negative diodes to form the bridge circuit, axially-extending three U-shaped terminal members 51 disposed at the peripheral portion thereof, and a resinous insulation cover which has three through-holes 551 respectively formed to correspond to three terminal members 51. Output terminal 531 extends from positive cooling fin 53.

Figure 10:
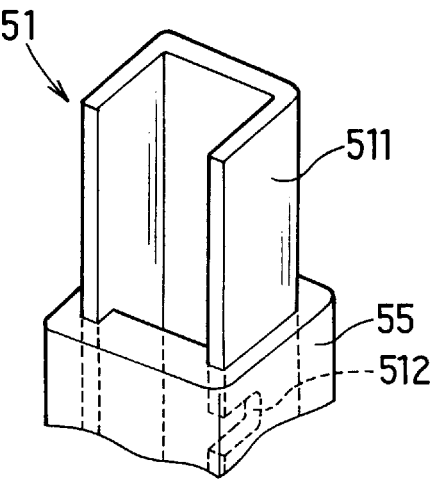
FIG. 10 is an enlarged perspective view illustrating a terminal member according to a variation of the first embodiment of the invention.

U-shaped terminal members 51 have three side walls along the length thereof and U-shaped terminal edge 511 projecting outside from the insulation cover of connection member 55. The three side walls form a generally rectangular cross-section that is resistant to strong bending vibration. Terminal member 51 has small recess 512 formed at a portion of one of the side walls near the insulation cover to provide a heat block portion whose cross-section is smaller than others. However, the heat block portion still has the three side walls and two corners 513. The heat block portion prevents the welding heat from transferring to connection member 55 and rectifier unit 5. The heat block portion having recess 512 is partly immersed in the insulation cover. Whole heat block portion can be immersed in the insulation cover as shown in FIG. 10. Thus, U-shaped terminal member 51 has generally rectangular cross-section even at the heat block portion having the decreased cross-sectional area, and is resistant to strong vibration.

Figure 2:
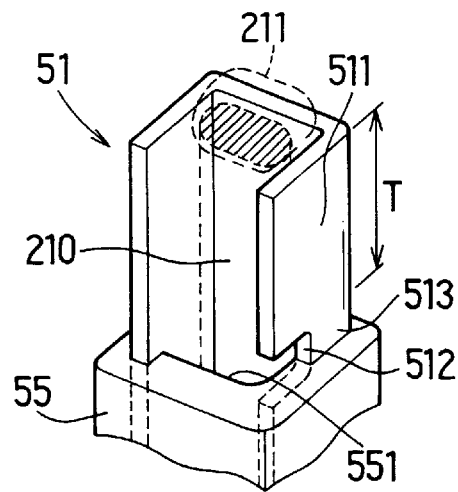
FIG. 2 is an enlarged perspective view illustrating a terminal member of the AC generator according to the first embodiment.
Figure 3:
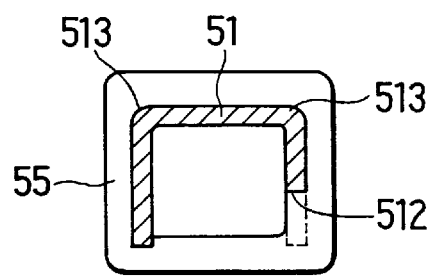
FIG. 3 is a cross-sectional plan view of the terminal member illustrated in FIG. 2.

As shown in FIG. 1, each lead 210 extends through holes 551 of connection member 55 and along terminal member 51 to the inside of U-shaped terminal edge 511, where it is welded by a tungsten-inert-gas (or TIG) welder to form junction 211 as shown in FIG. 2. Thus, leads 210 are guided along the side walls of terminal members 51 when they are connected to terminal edges 511. Leads 210 can be connected to terminal members 51 mechanically between the side walls being squashed. Since leads 210 have a rectangular cross-section, it is easy to provide a sufficient contact area T of lead 210 with connection terminal 55 as illustrated by hatching in FIG. 2.

Rear cover 6 is press-formed from an aluminum plate to protect rectifier unit 5 and other electric parts. Rear cover 6 has also air intake windows (not shown) at the rear end thereof.

When AC generator 1 is driven by an engine via pulley 7, rotor 3 rotates to generate AC electric power at armature winding 21. The AC electric power is converted by rectifier unit 5 into DC power to charge a battery (not shown) and to supply DC power to other electric devices (not shown) from output terminal 531. Consequently, cooling fans 35, 36 supply cooling air to armature winding 21 and rectifier unit 5. Even if strong vibration is applied to AC generator, U-shaped terminal members 5 are not broken.

Figure 4:
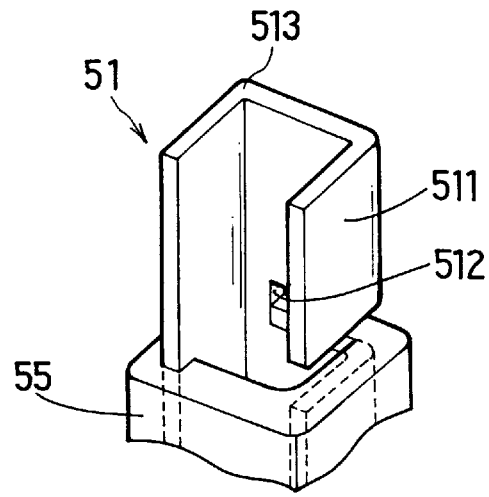
FIG. 4 is an enlarged perspective view illustrating a terminal member according to a second embodiment of the invention.
Figure 5:
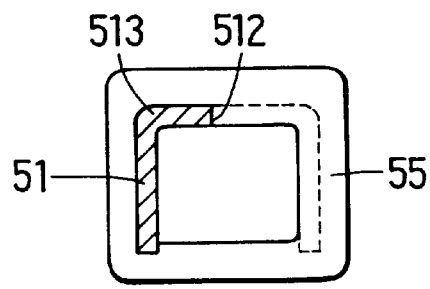
FIG. 5 is a cross-sectional plan view of the terminal member according to the second embodiment.

Terminal member 51 according to a second embodiment of the invention is illustrated in FIGS. 4 and 5. Heat block portion with recess 512 has one corner or L-shaped side walls. This provides vibration strength and significantly prevents the welding heat from transferring to the connection member and rectifier unit.

Figure 6:
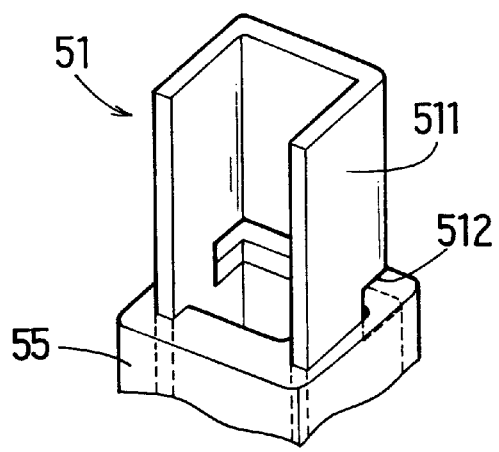
FIG. 6 is an enlarged perspective view illustrating a terminal member according to a third embodiment of the invention.
Figure 7:
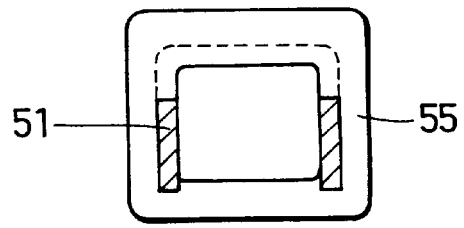
FIG. 7 is a cross-sectional plan view of the terminal member according to the third embodiment.

Terminal member 51 according to a third embodiment of the invention is illustrated in FIGS. 6 and 7.

The heat block portion with recess 512 has two side walls, which provide sufficient vibration strength.

Figure 8:
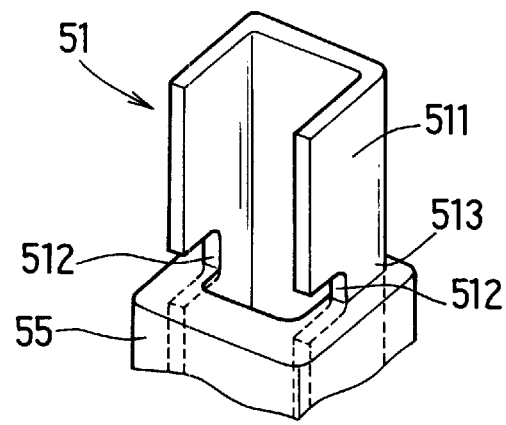
FIG. 8 is an enlarged perspective view illustrating a terminal member according to a fourth embodiment of the invention.
Figure 9:
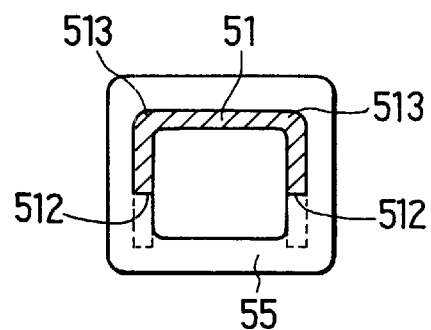
FIG. 9 is a cross-sectional plan view of the terminal member according to the fourth embodiment.

Terminal member 51 according to a fourth embodiment of the invention is illustrated in FIGS. 8 and 9.

The heat block portion with recess 512 has three side walls and two corners 513, which provide sufficient vibration strength.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A vehicle AC generator comprising:

a stator having an armature winding, said armature winding having a plurality of leads extending therefrom;

a rectifier unit having plus and minus diodes;

a plurality of U-shaped terminal members respectively guiding said leads of said armature winding, each of said terminal members having three longitudinal side walls forming generally rectangular cross-section, one end connected to said rectifier unit, the other end connected to one of said leads, and a heat-block portion having at least two of said side walls.

2. The vehicle AC generator as claimed in claim 1, wherein said heat-block portion has L-shaped side walls.

3. The vehicle AC generator as claimed in claim 1, wherein at least a portion of said heat-block portion is disposed inside said insulation member.

4. The vehicle AC generator as claimed in claim 1, wherein said heat-block portion has U-shaped side walls.

5. The vehicle AC generator as claimed in claim 1 wherein each of said terminal members is welded by a welder to one of said leads.

6. The vehicle AC generator as claimed in claim 1 wherein each of said terminal members is mechanically connected to one of said leads.

7. The vehicle AC generator as claimed in claim 1 wherein said armature winding is formed of a flat wire.

8. The vehicle AC generator as claimed in claim 5 wherein said welder is a TIG welder.

* * * * *